United States Patent
Kim

(10) Patent No.: US 10,976,738 B2
(45) Date of Patent: Apr. 13, 2021

(54) APPARATUS AND METHOD FOR CONTROLLING DRIVING OF VEHICLE IN THE EVENT OF AN ACCIDENT

(71) Applicants: Hyundai Motor Company, Seoul (KR); Kia Motors Corporation, Seoul (KR)

(72) Inventor: Han Shik Kim, Seoul (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 446 days.

(21) Appl. No.: 16/152,756

(22) Filed: Oct. 5, 2018

(65) Prior Publication Data

US 2020/0042002 A1 Feb. 6, 2020

(30) Foreign Application Priority Data

Aug. 1, 2018 (KR) .................. 10-2018-0089708

(51) Int. Cl.
| | |
|---|---|
| *G05D 1/00* | (2006.01) |
| *G05D 1/02* | (2020.01) |
| *G01C 21/34* | (2006.01) |
| *G07C 5/08* | (2006.01) |

(52) U.S. Cl.
CPC ....... *G05D 1/0088* (2013.01); *G01C 21/3415* (2013.01); *G01C 21/3438* (2013.01); *G05D 1/0055* (2013.01); *G05D 1/0212* (2013.01); *G05D 1/0231* (2013.01); *G05D 1/0255* (2013.01); *G05D 1/0257* (2013.01); *G05D 1/0276* (2013.01); *G07C 5/0808* (2013.01); *G05D 2201/0213* (2013.01)

(58) Field of Classification Search
None
See application file for complete search history.

(56) References Cited

U.S. PATENT DOCUMENTS

| | | | |
|---|---|---|---|
| 10,156,845 B1* | 12/2018 | Greenberger | G08G 1/096725 |
| 10,156,848 B1* | 12/2018 | Konrardy | G06F 16/2455 |
| 10,295,363 B1* | 5/2019 | Konrardy | B60P 3/12 |
| 10,386,192 B1* | 8/2019 | Konrardy | B60R 25/252 |
| 10,503,168 B1* | 12/2019 | Konrardy | G05D 1/0287 |
| 10,545,024 B1* | 1/2020 | Konrardy | B60W 10/18 |
| 2017/0030725 A1* | 2/2017 | Gordon | G01C 21/3492 |
| 2017/0192429 A1* | 7/2017 | Tseng | H04W 4/02 |
| 2018/0090000 A1* | 3/2018 | Bravo | G01C 21/3415 |
| 2018/0245938 A1* | 8/2018 | Song | G01C 21/3407 |
| 2018/0293886 A1* | 10/2018 | Frederick | G08G 1/0965 |
| 2018/0335781 A1* | 11/2018 | Chase | G08G 1/096758 |
| 2019/0120643 A1* | 4/2019 | Schmell | G01C 21/3438 |

(Continued)

*Primary Examiner* — Shelley Chen
(74) *Attorney, Agent, or Firm* — Mintz Levin Cohn Ferris Glovsky and Popeo, P.C.; Peter F. Corless

(57) ABSTRACT

An apparatus for controlling driving of a vehicle includes a communication device transmitting information indicating that an event of the vehicle occurs to a server and receiving path information of a rescue vehicle associated with a location where the event occurs from the server, a determination device determining whether autonomous driving is possible based on state information of the vehicle if the event occurs, and a driving controller controlling the autonomous driving of the vehicle based on the path information of the rescue vehicle if the autonomous driving is possible.

16 Claims, 7 Drawing Sheets

(56) References Cited

U.S. PATENT DOCUMENTS

2019/0129420 A1* 5/2019 Yoshizaki ............. B60W 30/16
2019/0137996 A1* 5/2019 Zhang .................. G06K 9/6201
2019/0361451 A1* 11/2019 Wilson .................. G08G 1/205

* cited by examiner

APPARATUS AND METHOD FOR CONTROLLING DRIVING OF VEHICLE IN THE EVENT OF AN ACCIDENT

CROSS-REFERENCE TO RELATED APPLICATION

This application claims under 35 U.S.C. § 119(a) the benefit of Korean Patent Application No. 10-2018-0089708, filed on Aug. 1, 2018 in the Korean Intellectual Property Office, the entire contents of which are incorporated by reference herein.

BACKGROUND

(a) Technical Field

The present disclosure relates to an apparatus and method for controlling driving of a vehicle, more particularly, to the apparatus and method for controlling driving of the vehicle in the event of an accident in which the vehicle may be driven autonomously to meet a rescue vehicle and thus reduce a time required for emergency response/rescue.

(b) Description of the Related Art

The use of transportation, especially vehicles, is a necessary part of daily life. The number of vehicles continues to increase throughout the world, and the frequency and the scale of vehicle accidents also may be increasing. Since vehicle accidents often are accompanied by personal injury, various technologies have been developed for a quick emergency response/rescue in the event a vehicle accident occurs.

An eCall system is a technology that detects a crash (i.e., in the event of a vehicle accident) and then transmits an emergency call including location information of the vehicle accident to a rescue center to notify the rescue center of the accident, and in fact, some countries require all vehicles to be equipped with the eCall system.

However, in the event of an accident, the arrival of a rescue vehicle to the location of the accident may be delayed. In this case, the eCall system may become obsolete.

SUMMARY

An aspect of the present disclosure provides an apparatus and method for controlling driving of a vehicle that makes it possible to quickly rescue vehicle occupants in the event of a vehicle accident.

The technical problems to be solved by the present inventive concept are not limited to the aforementioned problems, and any other technical problems not mentioned herein will be clearly understood from the following description by those skilled in the art to which the present disclosure pertains.

According to an embodiment of the present disclosure, an apparatus for controlling driving of a vehicle may include a communication device transmitting information indicating that an event of the vehicle occurs to a server and receiving path information of a rescue vehicle associated with a location where the event occurs from the server, a determination device determining whether autonomous driving is possible based on state information of the vehicle if the event occurs, and a driving controller controlling the autonomous driving of the vehicle based on the path information of the rescue vehicle if the autonomous driving is possible.

According to an embodiment, the driving controller may control the autonomous driving of the vehicle so as to move the vehicle on a path corresponding to the path information of the rescue vehicle from the location where the event occurs.

According to an embodiment, the driving controller may extract a location where a time required until the vehicle meets the rescue vehicle is minimized, by using the location where the event occurs and the path information of the rescue vehicle and controls the autonomous driving of the vehicle so as to move the vehicle to the extracted location.

According to an embodiment, the driving controller may control the autonomous driving of the vehicle so as to move the vehicle to the extracted location based on location suitability of the location where the time required until the vehicle meets the rescue vehicle is minimized.

According to an embodiment, the communication device may receive changed path information of the rescue vehicle from the server.

According to an embodiment, the driving controller may extract the location where the time required until the vehicle meets the rescue vehicle is minimized, by using a current location of the vehicle and the changed path information of the rescue vehicle and may control the autonomous driving of the vehicle so as to move the vehicle to the extracted location.

According to an embodiment, the state information of the vehicle may include information about whether at least one of a driving assistance function, a sensing device, a steering device, a braking device, an engine, and a transmission of the vehicle fails.

According to an embodiment, the sensing device may include at least one of an ultrasonic sensor, a camera, a radar sensor, and a Lidar sensor.

According to an embodiment, the information indicating that the event occurs may include a time when the event occurs, location information of a place where the event occurs, and a driving direction of a road where the event occurs.

According to an embodiment of the present disclosure, a method for controlling driving of a vehicle may include transmitting, by a communication device, information indicating that an event of the vehicle occurs to a server; determining, by a determination device, whether autonomous driving is possible based on state information of the vehicle if the event occurs; receiving, by a driving controller, path information of a rescue vehicle associated with a location where the event occurs, from the server; and controlling, by the driving controller, the autonomous driving of the vehicle based on the path information of the rescue vehicle if the autonomous driving is possible.

According to an embodiment, controlling the autonomous driving of the vehicle based on the path information of the rescue vehicle if the autonomous driving is possible may include extracting a location where a time required until the vehicle meets the rescue vehicle is minimized, by using the location where the event occurs and the path information of the rescue vehicle and controlling the autonomous driving of the vehicle so as to move the vehicle to the extracted location on a path corresponding to the path information of the rescue vehicle.

According to an embodiment, controlling the autonomous driving of the vehicle so as to move the vehicle to the extracted location on the path corresponding to the path information of the rescue vehicle may include controlling the autonomous driving of the vehicle so as to move the vehicle to the extracted location on the path corresponding to the path information of the rescue vehicle, based on location suitability of the location where the time required until the vehicle meets the rescue vehicle is minimized.

According to an embodiment, the method may further include receiving changed path information of the rescue vehicle from the server and controlling the autonomous driving of the vehicle based on the changed path information of the rescue vehicle.

According to an embodiment, controlling the autonomous driving of the vehicle based on the changed path information of the rescue vehicle may include extracting the location where the time required until the vehicle meets the rescue vehicle is minimized, by using a current location of the vehicle and the changed path information of the rescue vehicle, and controlling the autonomous driving of the vehicle so as to move the vehicle to the extracted location on the path corresponding to the changed path information of the rescue vehicle.

According to an embodiment, the state information of the vehicle may include information about whether at least one of a driving assistance function, a sensing device, a steering device, a braking device, an engine, and a transmission of the vehicle fails.

According to an embodiment, the information indicating that the event occurs may include a time when the event occurs, location information of a place where the event occurs, and a driving direction of a road where the event occurs.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
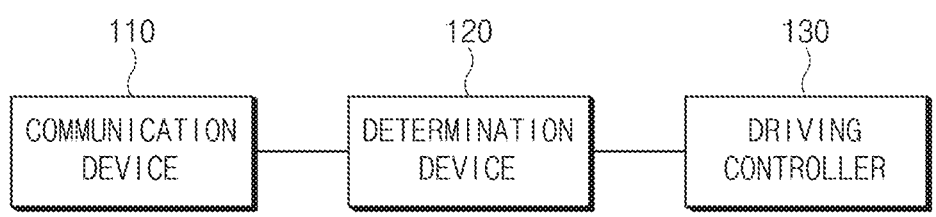
FIG. 1 is a block diagram of an apparatus for controlling driving of a vehicle, according to an embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, exemplary embodiments of the present disclosure will be described in detail with reference to the accompanying drawings. In the drawings, the same reference numerals will be used throughout to designate the same or equivalent elements. In addition, a detailed description of well-known features or functions will be ruled out in order not to unnecessarily obscure the gist of the present disclosure.

In describing elements of exemplary embodiments of the present disclosure, the terms first, second, A, B, (a), (b), and the like may be used herein. These terms are only used to distinguish one element from another element, but do not limit the corresponding elements irrespective of the order or priority of the corresponding elements. Furthermore, unless otherwise defined, all terms including technical and scientific terms used herein are to be interpreted as is customary in the art to which this invention belongs. It will be understood that terms used herein should be interpreted as having a meaning that is consistent with their meaning in the context of the present disclosure and the relevant art and will not be interpreted in an idealized or overly formal sense unless expressly so defined herein.

According to an embodiment of the present disclosure, an apparatus for controlling driving of a vehicle may be disposed in the vehicle, may transmit information indicating that an event of the vehicle occurs to a server, in order to request a rescue; and the apparatus for controlling driving of the vehicle may control autonomous driving of the vehicle such that the vehicle meets the rescue vehicle in the shortest time based on path information of a rescue vehicle received from the server. In particular, the event may be an accident involving the vehicle, mechanical failure of the vehicle, or a case where an occupant of the vehicle suffers a medical emergency.

Hereinafter, according to an embodiment of the present disclosure, the above-described apparatus for controlling driving of a vehicle will be described with reference to drawings. For convenience of description, a vehicle equipped with the apparatus for controlling driving of the vehicle is defined as a "vehicle" and will be described.

FIG. 1 is a block diagram of an apparatus for controlling driving of a vehicle, according to an embodiment of the present disclosure.

Referring to FIG. 1, an apparatus for controlling driving of a vehicle 100 according to an embodiment of the present disclosure may include a communication device 110, a determination device 120, and a driving controller 130.

The communication device 110 may transmit event occurrence information to a server if an event of the vehicle occurs. For example, the event occurrence information may be information associated with an eCall operation and may include a point in time when an event occurs, location information of a place where the event occurs, a type of the vehicle, a fuel type of the vehicle, driving directions of a road where the event occurs, and the like, and may not be limited thereto. Further, for example, a server may be the server of an eCall management center. Hereinafter, this will be described in more detail with reference to FIG. 6.

The communication device 110 may receive, from the server, path information of a rescue vehicle associated with a location where an event occurs. In the meantime, the communication device 110 may receive changed path information of the rescue vehicle from a server, if a path of the rescue vehicle is changed. Herein, the rescue vehicle associated with the location where an event occurs may mean a rescue vehicle that verifies the location where the event occurs from the server and then moves to the location where the event occurs. The communication device 110 may transmit the received path information of the rescue vehicle to the driving controller 130.

The determination device 120 may determine whether autonomous driving of the vehicle is possible, based on state information of the vehicle. For example, the state information of the vehicle may include information about whether at least one of a driving assistance function, a sensing device, a steering device, a braking device, an engine, and a transmission of the vehicle has failed.

In particular, the driving assistance function of the vehicle may include various Advanced Driver Assistance System (ADAS)-related functions, and may include at least one of, for example, a Forward Collision Warning (FCW) function, an Autonomous Emergency Braking (AEB) function, a Lane Departure Warning System (LDWS)/Lane Keeping Assist System (LKAS) function, a Smart Adaptive Cruise Control function, a Blind Spot Detection (BSD)/Advanced Blind Spot Detection (ABSD) function, a Highway Driver Assist (HDA) function. Also, the sensing device may include at least one of an ultrasonic sensor, a camera, a radar sensor, and a Lidar sensor.

The determination device 120 may determine whether autonomous driving of the vehicle is possible, based on state information of the vehicle, if an event occurs. For example, the determination device 120 may determine that the autonomous driving is in an inoperable state, if at least one of the driving assistance function, the sensing device, the steering device, the braking device, the engine, and the transmission of the vehicle is in a fault state (or an inoperable state). Moreover, for example, the determination device 120 may determine that the autonomous driving is possible, if the driving assistance function, the sensing device, the steering device, the braking device, the engine, and the transmission of the vehicle are not in a fault state or are damaged physically but operations are possible.

The driving controller 130 may control the autonomous driving of the vehicle. The driving controller 130 may control the autonomous driving of the vehicle based on various driving assistance functions of the vehicle.

The driving controller 130 may control the autonomous driving of the vehicle based on path information of the rescue vehicle, if the autonomous driving of the vehicle is possible. For example, the driving controller 130 may control the autonomous driving of the vehicle so as to move the vehicle on a path corresponding to the path information of the rescue vehicle from a location where an event occurs. In particular, the driving controller 130 may extract a location where a time required until the vehicle meets the rescue vehicle is minimized, by using a location where an event occurs and the path information of the rescue vehicle and may control the autonomous driving of the vehicle so as to move the vehicle to the extracted location. Accordingly, the vehicle may meet the rescue vehicle through the autonomous driving in the shortest time, and thus a quick rescue may be possible if an accident occurs.

In addition, the driving controller 130 may control the autonomous driving of the vehicle so as to move the vehicle to the extracted location based on location suitability of the location where the time required until the vehicle meets the rescue vehicle is minimized. In particular, the driving controller 130 may control the autonomous driving of the vehicle so as to move the vehicle to the extracted location based on the number of lanes and the type of a road, which are at the location where a time required until the vehicle meets the rescue vehicle is minimized. For example, the driving controller 130 may control the autonomous driving of the vehicle so as to move the vehicle to another location, not the location where a time required until the vehicle meets the rescue vehicle is minimized, if the number of lanes at the location where a time required until the vehicle meets the rescue vehicle is minimized is a two-lane road or if a lane at the location is a highway. In particular, the other location may be determined among locations within a predetermined distance range from the location where a time required until the vehicle meets the rescue vehicle is minimized, in consideration of the number of lanes and the type of road.

The driving controller 130 may control the autonomous driving of the vehicle based on changed path information of the rescue vehicle. For example, the driving controller 130 may extract a location where a time required until the vehicle meets the rescue vehicle is minimized, by using the current location of the vehicle and the changed path information of the rescue vehicle and may control the autonomous driving of the vehicle so as to move the vehicle to the extracted location. Accordingly, the vehicle may meet the rescue vehicle through the autonomous driving in the shortest time by reflecting the changed path information of the rescue vehicle in real time, and thus a quick rescue may be possible if an accident occurs.

Figure 2:
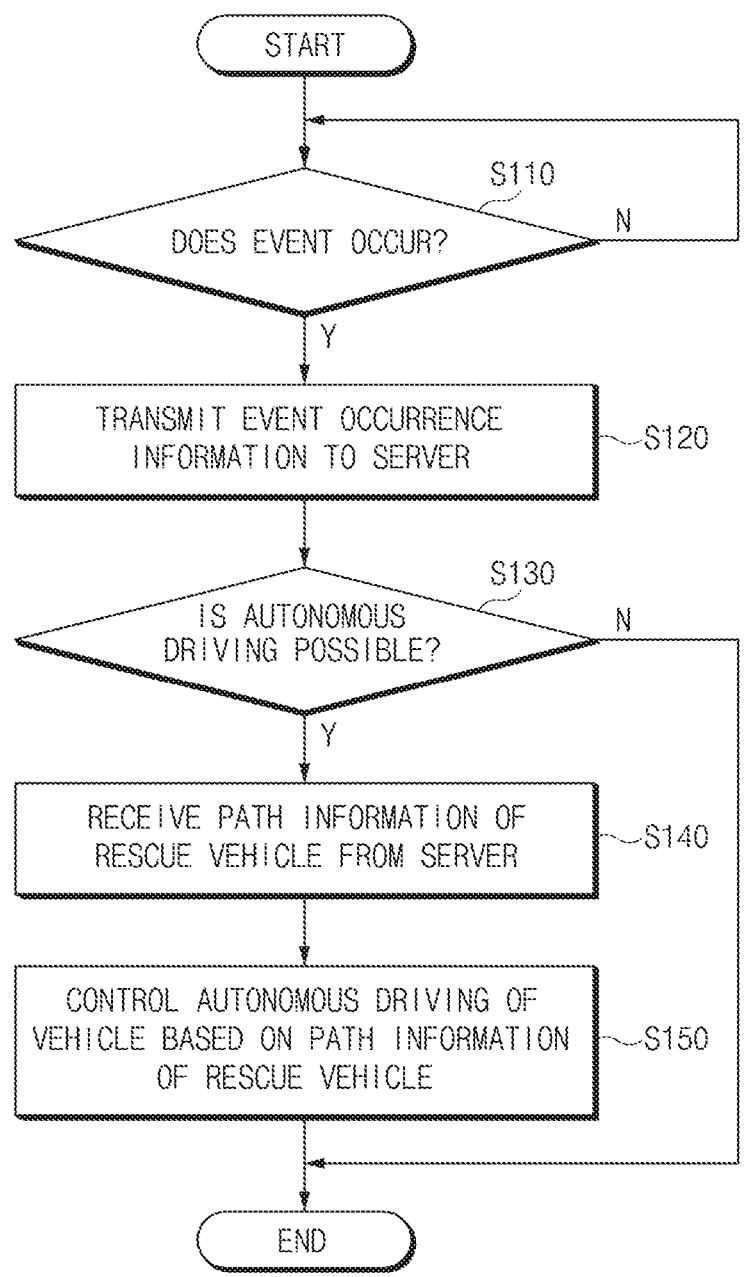
FIG. 2 is a flowchart of a method for controlling driving of a vehicle, according to an embodiment of the present disclosure.
Figure 3:
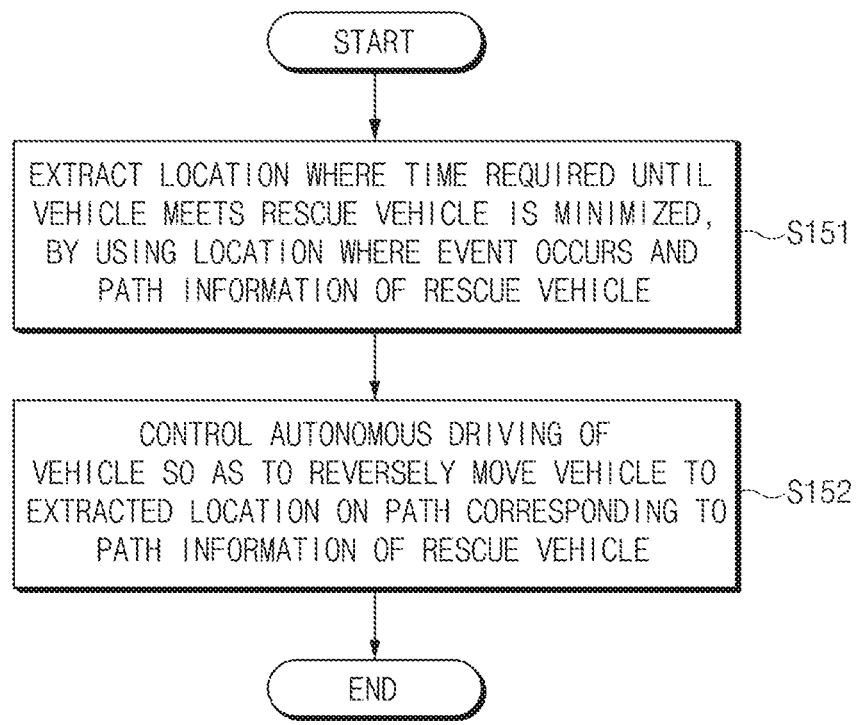
FIG. 3 is a flowchart for describing autonomous driving control operations of a method for controlling driving of a vehicle, according to an embodiment of the present disclosure.

FIG. 2 is a flowchart of a method for controlling driving of a vehicle, according to an embodiment of the present disclosure. FIG. 3 is a flowchart for describing autonomous driving control operations of a method for controlling driving of the vehicle, according to an embodiment of the present disclosure.

Referring to FIGS. 2 and 3, a method for controlling driving of a vehicle according to an embodiment of the present disclosure may include operation S110 of determining whether an event of the vehicle occurs, operation S120 of transmitting event occurrence information to a server if the event occurs, operation S130 of determining whether the autonomous driving is possible, based on state information of the vehicle if an event occurs, operation S140 of receiving path information of the rescue vehicle associated with a location where an event occurs from the server, and operation S150 of controlling the autonomous driving of the vehicle based on path information of the rescue vehicle if the autonomous driving is possible.

In addition, operation S150 may include operation S151 of extracting a location where a time required until the vehicle meets the rescue vehicle is minimized, by using a location where an event occurs and the path information of the rescue vehicle and operation S152 of controlling autonomous driving of the vehicle so as to move the vehicle to the extracted location on a path corresponding to the path information of the rescue vehicle.

Hereinafter, the above-described operations S110 to S150 will be described with reference to FIG. 1.

In operation S110, the determination device 120 may determine whether an event of a vehicle occurs. For example, the determination device 120 may determine whether the event of the vehicle occurs, based on whether an airbag of the vehicle deploys.

In operation S120, the communication device 110 may transmit event occurrence information to a server if the event of the vehicle occurs. For example, the event occurrence information may be information associated with an eCall operation and may include a point in time when an event occurs, location information of a place where the event occurs, driving directions of a mad where the event occurs, and the like, and may not be limited thereto.

In operation S130, the determination device 120 may determine whether autonomous driving of the vehicle is possible, based on state information of the vehicle. For example, the state information of the vehicle may include information about whether at least one of the driving assist function, the sensing device, the steering device, the braking device, the engine, and the transmission of the vehicle has failed.

In operation S140, the communication device 110 may receive, from the server, the path information of the rescue vehicle associated with a location where the event occurs.

In operation S150, the driving controller 130 may control the autonomous driving of the vehicle based on path information of the rescue vehicle, if the autonomous driving of the vehicle is possible.

In operation S151, the driving controller 130 may extract a location where a time required until the vehicle meets the rescue vehicle is minimized, by using the location where the event occurs and the path information of the rescue vehicle.

In operation S152, the driving controller 130 may control the autonomous driving of the vehicle so as to move the vehicle on a path corresponding to the path information of the rescue vehicle to the extracted location. In the meantime, the driving controller 130 may control the autonomous driving of the vehicle so as to move the vehicle to the extracted location based on location suitability of the location where a time required until the vehicle meets the rescue vehicle is minimized.

Accordingly, the vehicle may meet the rescue vehicle through the autonomous driving in the shortest time, and thus a quick rescue may be possible if an accident occurs.

Figure 4:
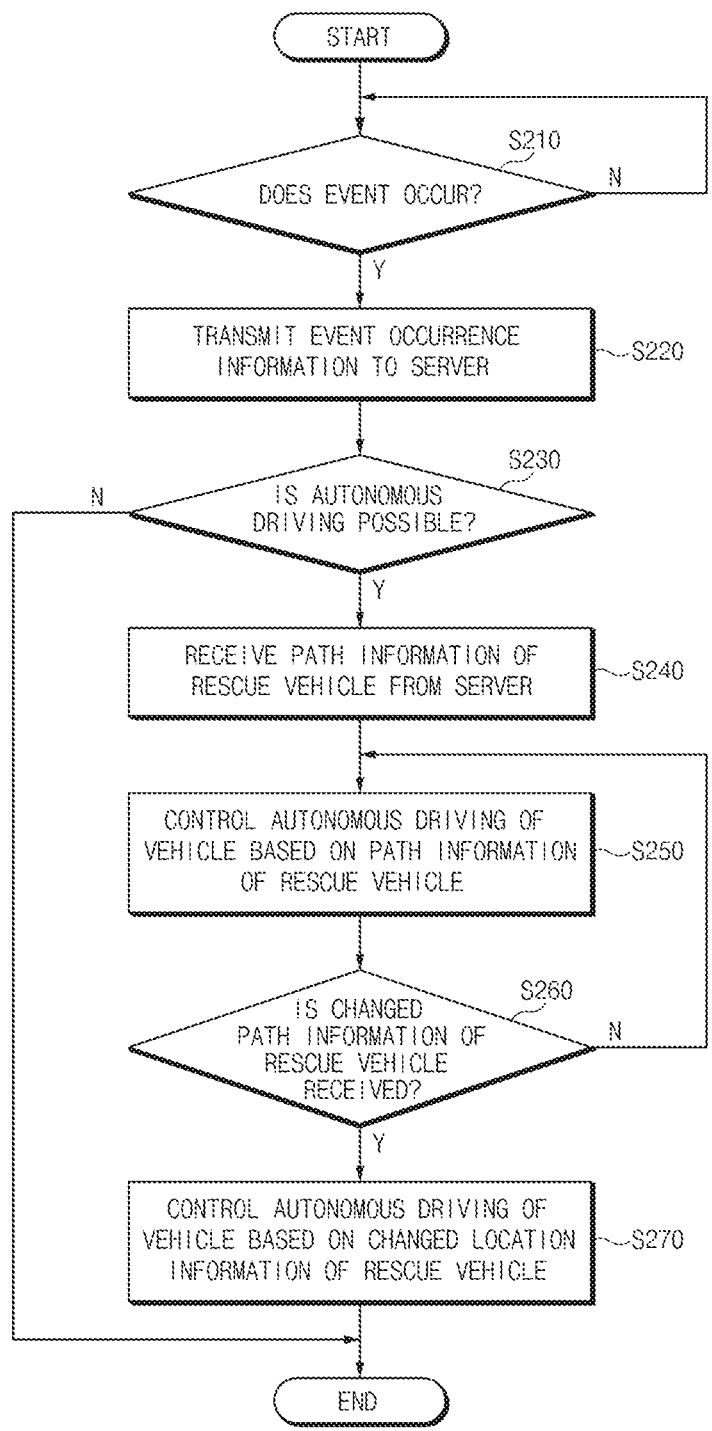
FIG. 4 is a flowchart of a method for controlling driving of a vehicle, according to another embodiment of the present disclosure.
Figure 5:
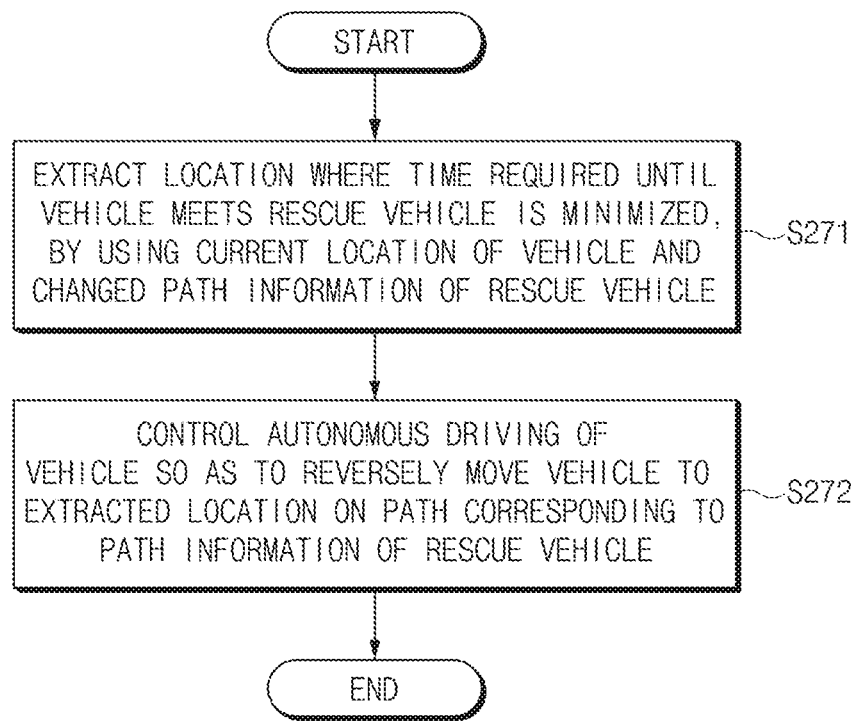
FIG. 5 is a flowchart for describing autonomous driving control operations of a method for controlling driving of a vehicle, according to another embodiment of the present disclosure.

FIG. 4 is a flowchart of a method for controlling driving of a vehicle, according to another embodiment of the present disclosure. FIG. 5 is a flowchart for describing autonomous driving control operations of a method for controlling driving of a vehicle, according to another embodiment of the present disclosure.

Referring to FIGS. 4 and 5, a method for controlling driving of a vehicle according to another embodiment of the present disclosure may include operation S210 of determining whether an event of the vehicle occurs, operation S220 of transmitting event occurrence information to a server if the event occurs, operation S230 of determining whether autonomous driving is possible, based on state information of the vehicle if the event occurs, operation S240 of receiving path information of the rescue vehicle associated with a location where the event occurs, from the server, operation S250 of controlling autonomous driving of the vehicle based on path information of the rescue vehicle if the autonomous driving is possible, operation S260 of determining whether the changed path information of the rescue vehicle is received, and operation S270 of controlling the autonomous driving of the vehicle based on the changed location information of the rescue vehicle, if the changed path information of the rescue vehicle is received.

In addition, operation S270 may include operation S271 of extracting a location where a time required until the vehicle meets the rescue vehicle is minimized, by using the current location of the vehicle and the path information of the rescue vehicle and operation S272 of controlling autonomous driving of the vehicle so as to move the vehicle to the extracted location on a path corresponding to the path information of the rescue vehicle.

Hereinafter, above-described operation S210 to operation S270 will be described with reference to FIG. 1. However, operations S210 to S250 are substantially the same as operations S110 to S150 with reference to FIG. 2, and thus only operation S260 and operation S270 will be described below.

In operation S260, the communication device 110 may determine whether changed path information of the rescue vehicle associated with a location where the event occurs is received from the server. The communication device 110 may transmit the received path information to the driving controller 130, if the changed path information of the rescue vehicle is received.

In operation S270, the driving controller 130 may control the autonomous driving of the vehicle based on the changed path information of the rescue vehicle.

In operation S271, the driving controller 130 may extract a location where a time required until the vehicle meets the rescue vehicle is minimized, by using the current location of the vehicle and the path information of the rescue vehicle.

In operation S272, the driving controller 130 may control the autonomous driving of the vehicle so as to move the vehicle on a path corresponding to the changed path information of the rescue vehicle to the extracted location. Accordingly, the vehicle may meet the rescue vehicle through the autonomous driving in the shortest time by reflecting the changed path information of the rescue vehicle in real time, and thus a quick rescue may be possible if an accident occurs.

Figure 6:
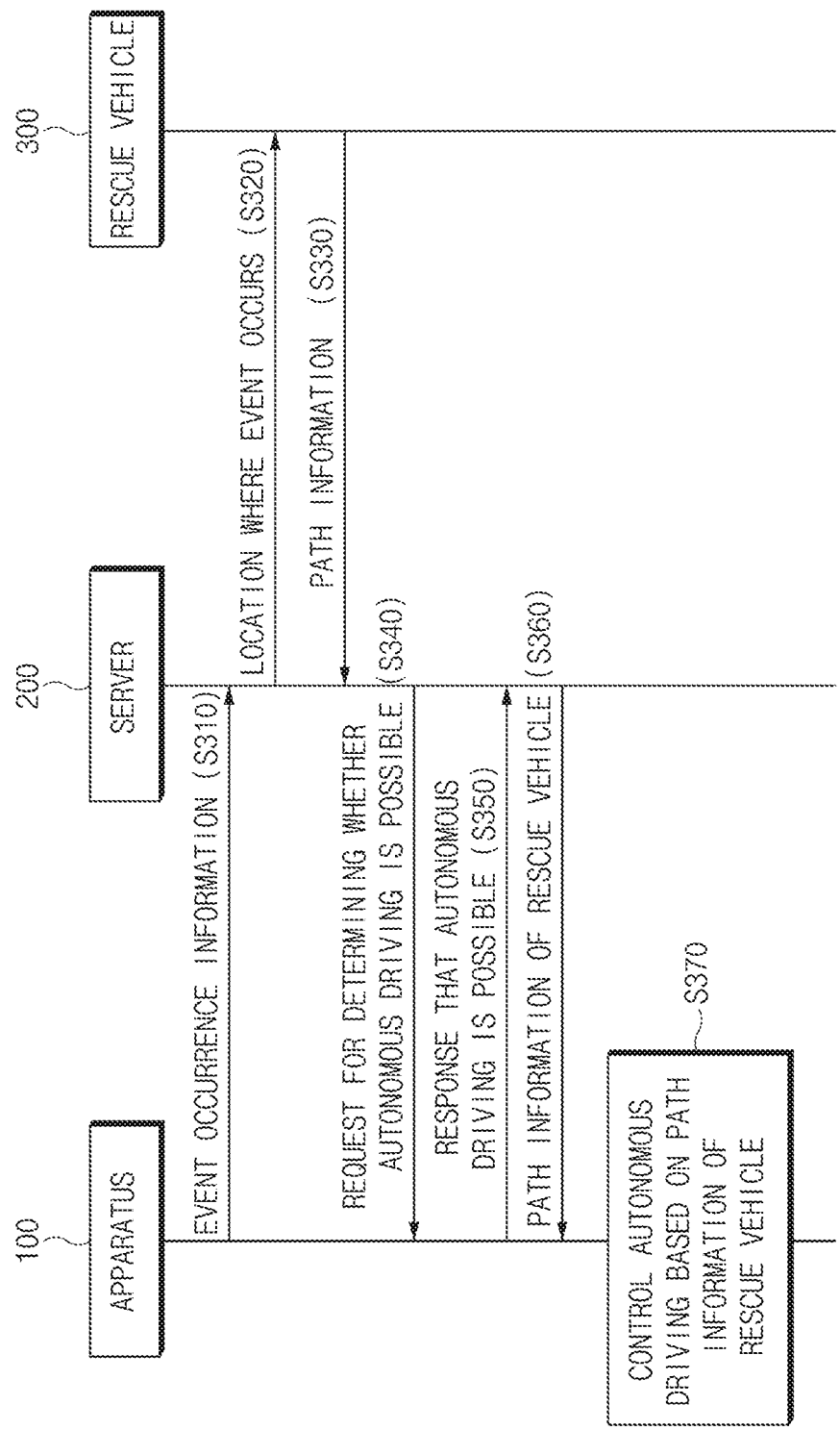
FIG. 6 is a schematic view of a driving control system of a vehicle, according to an embodiment of the present disclosure.

FIG. 6 is a view for describing a driving control system of a vehicle, according to an embodiment of the present disclosure.

Referring to FIG. 6, in operation S310, the apparatus for controlling driving of the vehicle 100 may transmit event occurrence information to a server 200, if an event occurs. For example, the event occurrence information may be information associated with an eCall operation and may include a point in time when an event occurs, location information of a place where the event occurs, the driving direction of a road where the event occurs, and the like, and may not be limited thereto.

In operation 320, the server 200 may verify the event occurrence information and may transmit a location where the event occurs, to the rescue vehicle associated with the location where the event occurs, if the event occurrence information is received from the apparatus for controlling driving of the vehicle 100. Herein, the server 200 may be an eCall control server or an emergency rescue center server, but is not limited thereto. For example, the rescue vehicle associated with the location where the event occurs may be located closest to the location where the event occurs or may be the rescue vehicle that is most suitable to handle the occurring event.

In operation S330, a rescue vehicle 300 may search for a path from the current location of the rescue vehicle 300 to a location where an event occurs and may transmit information about the path to the server 200.

In operation S340, the server 200 may transmit, to the apparatus for controlling driving of the vehicle 100, a request for determining whether autonomous driving is possible.

The apparatus for controlling driving of the vehicle 100 may determine whether the autonomous driving is possible; in operation S350, the apparatus for controlling driving of the vehicle 100 may transmit, to the server 200, a response that the autonomous driving is possible, if the autonomous driving is in fact possible.

In operation S360, the server 200 may transmit the path information of the rescue vehicle 300 to the apparatus for controlling driving of the vehicle 100, if the autonomous driving of the vehicle is possible.

In operation S370, the apparatus for controlling driving of the vehicle 100 may control the autonomous driving of the vehicle, based on the path information of the rescue vehicle 300 from the server 200. In particular, the apparatus for controlling driving of the vehicle 100 may extract a location where a time required until the vehicle meets the rescue vehicle 300 is minimized, by using a location where an event occurs and the path information of the rescue vehicle 300 and may control the autonomous driving of the vehicle so as to move the vehicle to the extracted location. Accordingly, the vehicle may meet the rescue vehicle 300 through the autonomous driving in the shortest time, and thus a quick rescue may be possible if an accident occurs.

Figure 7:
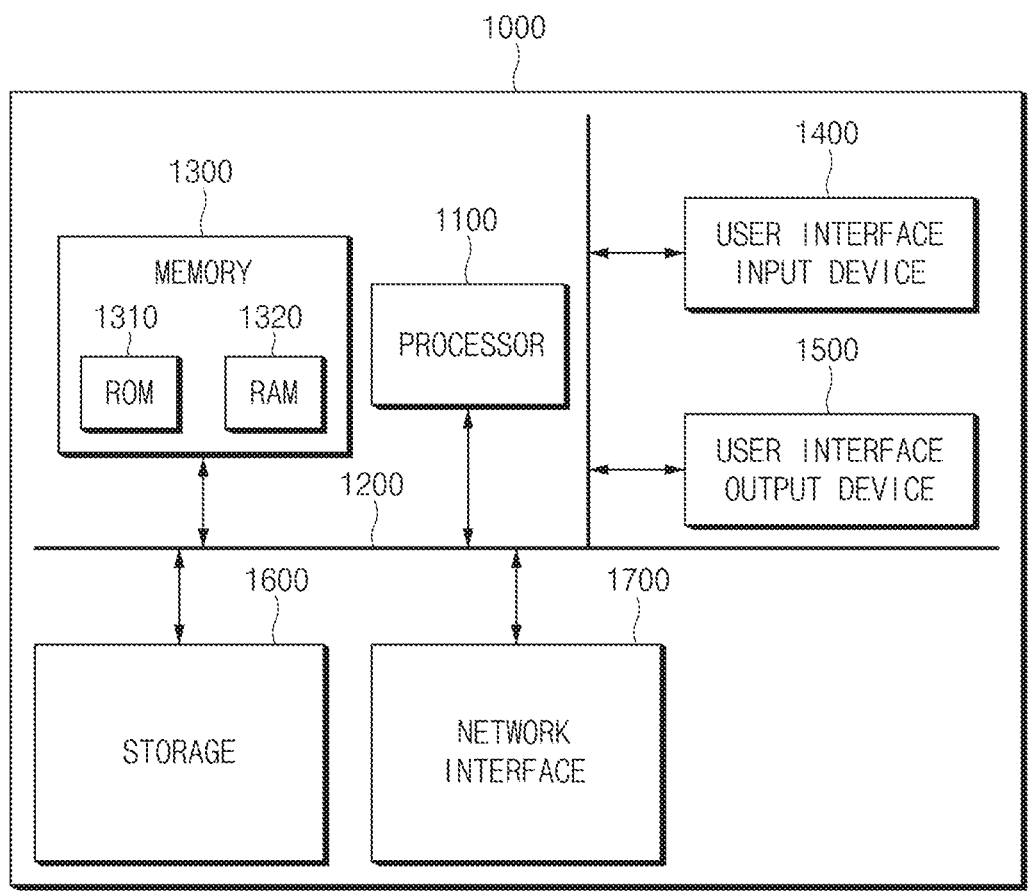
FIG. 7 is a block diagram of a computing system that performs a method for controlling driving of a vehicle, according to an embodiment of the present disclosure.

FIG. 7 is a block diagram of a computing system that performs a method for controlling driving of a vehicle, according to an embodiment of the present disclosure.

Referring to FIG. 7, the method for controlling driving of the vehicle according to an embodiment of the present disclosure may be implemented through a computing system. A computing system 1000 may include at least one processor 1100, a memory 1300, a user interface input device 1400, a user interface output device 1500, storage 1600, and a network interface 1700, which are connected with each other through a system bus 1200.

The processor 1100 may be a central processing unit (CPU) or a semiconductor device that processes instructions stored in the memory 1300 and/or the storage 1600. Each of the memory 1300 and the storage 1600 may include various types of volatile or nonvolatile storage media. For example, the memory 1300 may include a read only memory (ROM) and a random access memory (RAM).

Thus, the operations of the methods or algorithms described in connection with the embodiments disclosed in the specification may be directly implemented with a hardware module, a software module, or a combination of the hardware module and the software module, which is executed by the processor 1100. The software module may reside on a storage medium (i.e., the memory 1300 and/or the storage 1600) such as a RAM, a flash memory, a ROM, an erasable and programmable ROM (EPROM), an electrically EPROM (EEPROM), a register, a hard disc, a removable disc, or a compact disc-ROM (CD-ROM). The storage medium may be coupled to the processor 1100. The processor 1100 may read out information from the storage medium and may write information in the storage medium. Alternatively, the storage medium may be integrated with the processor 1100. The processor and storage medium may be implemented with an application specific integrated circuit (ASIC). The ASIC may be provided in a user terminal. Alternatively, the processor and storage medium may be implemented with separate components in the user terminal.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, embodiments of the present disclosure are not intended to limit the technical spirit of the present disclosure, but provided only for the illustrative purpose. The scope of protection of the present disclosure should be construed by the attached claims, and all equivalents thereof should be construed as being included within the scope of the present disclosure.

What is claimed is:

1. An apparatus for controlling driving of a vehicle, the apparatus comprising:
   a communication device configured to transmit information indicating that an event of the vehicle occurs to a server and receive path information of a rescue vehicle associated with a location where the event occurs from the server;
   a determination device configured to determine whether autonomous driving is possible based on state information of the vehicle if the event occurs; and
   a driving controller configured to control the autonomous driving of the vehicle based on the path information of the rescue vehicle if the autonomous driving is possible.

2. The apparatus of claim 1, wherein the driving controller controls the autonomous driving of the vehicle so as to move the vehicle on a path corresponding to the path information of the rescue vehicle from the location where the event occurs.

3. The apparatus of claim 2, wherein the driving controller extracts a location where a time required until the vehicle meets the rescue vehicle is minimized, by using the location where the event occurs and the path information of the rescue vehicle and controls the autonomous driving of the vehicle so as to move the vehicle to the extracted location.

4. The apparatus of claim 3, wherein the driving controller controls the autonomous driving of the vehicle so as to move the vehicle to the extracted location based on location suitability of the location where the time required until the vehicle meets the rescue vehicle is minimized.

5. The apparatus of claim 3, wherein the communication device receives changed path information of the rescue vehicle from the server.

6. The apparatus of claim 5, wherein the driving controller extracts the location where the time required until the vehicle meets the rescue vehicle is minimized, by using a current location of the vehicle and the changed path information of the rescue vehicle and controls the autonomous driving of the vehicle so as to move the vehicle to the extracted location.

7. The apparatus of claim 1, wherein the state information of the vehicle includes information about whether at least one of a driving assistance function, a sensing device, a steering device, a braking device, an engine, and a transmission of the vehicle fails.

8. The apparatus of claim 7, wherein the sensing device includes at least one of an ultrasonic sensor, a camera, a radar sensor, and a Lidar sensor.

9. The apparatus of claim 1, wherein the information indicating that the event occurs includes a time when the event occurs, location information of a place where the event occurs, and a driving direction of a road where the event occurs.

10. A method for controlling driving of a vehicle, the method comprising:
    transmitting, by a communication device, information indicating that an event of the vehicle occurs to a server;
    determining, by a determination device, whether autonomous driving is possible based on state information of the vehicle if the event occurs;
    receiving, by a driving controller, path information of a rescue vehicle associated with a location where the event occurs from the server; and
    controlling, by the driving controller, the autonomous driving of the vehicle based on the path information of the rescue vehicle if the autonomous driving is possible.

11. The method of claim 10, wherein controlling the autonomous driving of the vehicle based on the path information of the rescue vehicle if the autonomous driving is possible includes:
    extracting a location where a time required until the vehicle meets the rescue vehicle is minimized, by using the location where the event occurs and the path information of the rescue vehicle; and
    controlling the autonomous driving of the vehicle so as to move the vehicle to the extracted location on a path corresponding to the path information of the rescue vehicle.

12. The method of claim 11, wherein controlling the autonomous driving of the vehicle so as to move the vehicle to the extracted location on the path corresponding to the path information of the rescue vehicle includes:
    controlling the autonomous driving of the vehicle so as to move the vehicle to the extracted location on the path corresponding to the path information of the rescue vehicle, based on location suitability of the location where the time required until the vehicle meets the rescue vehicle is minimized.

13. The method of claim 11, further comprising:
    receiving changed path information of the rescue vehicle from the server; and
    controlling the autonomous driving of the vehicle based on the changed path information of the rescue vehicle.

14. The method of claim 13, wherein controlling the autonomous driving of the vehicle based on the changed path information of the rescue vehicle includes:
    extracting the location where the time required until the vehicle meets the rescue vehicle is minimized, by using a current location of the vehicle and the changed path information of the rescue vehicle; and
    controlling the autonomous driving of the vehicle so as to move the vehicle to the extracted location on the path corresponding to the changed path information of the rescue vehicle.

15. The method of claim 10, wherein the state information of the vehicle includes information about whether at least one of a driving assistance function, a sensing device, a steering device, a braking device, an engine, and a transmission of the vehicle fails.

16. The method of claim 10, wherein the information indicating that the event occurs includes a time when the event occurs, location information of a place where the event occurs, and a driving direction of a road where the event occurs.

* * * * *